United States Patent [19]

Skaalen et al.

[11] 4,195,872
[45] Apr. 1, 1980

[54] REMOTE CONTROLLED SAFETY HOOK

[75] Inventors: Clifford I. Skaalen, Oxnard; Philip M. Kling, Ventura, both of Calif.

[73] Assignee: The United States of America as represented by the Secretary of the Navy, Washington, D.C.

[21] Appl. No.: 955,434

[22] Filed: Oct. 27, 1978

[51] Int. Cl.² .............................................. B66C 1/36
[52] U.S. Cl. .................................. 294/82 R; 24/241 P
[58] Field of Search ....................... 294/75, 78 R, 82 R, 294/83 R, 89; 24/230.5 R, 233–235, 241 R, 241 P, 241 PL, 241 PP, 241 PS, 241 S, 241 SB, 241 SL, 241 SP

[56] References Cited

U.S. PATENT DOCUMENTS

| 393,952 | 12/1888 | Wood et al. | 24/241 PS |
| 558,998 | 4/1896 | Staman | 294/83 R |
| 745,225 | 11/1903 | Motherwell | 294/75 |
| 1,086,609 | 2/1914 | Nilson | 294/83 R |
| 1,524,761 | 2/1925 | Timbs | 24/241 P |
| 1,576,197 | 3/1926 | Kuffel et al. | 294/83 R |
| 1,814,900 | 7/1931 | Deppe | 24/241 PS |
| 3,032,848 | 5/1962 | Allen | 24/234 |
| 3,220,761 | 11/1965 | Himel | 294/83 R X |

Primary Examiner—Johnny D. Cherry
Attorney, Agent, or Firm—Richard S. Sciascia; Joseph M. St. Amand

[57] ABSTRACT

A hoist line hook provided with a spring biased safety gate and further provided with a remote operating device for the safety gate. The gate operating device comprises a tension cable (swivelly attached) to the safety gate with the cable extending through a hole in the shank of the hook; the opposite end of the cable is attached to a tagline for remotely opening the safety gate of the hook.

6 Claims, 2 Drawing Figures

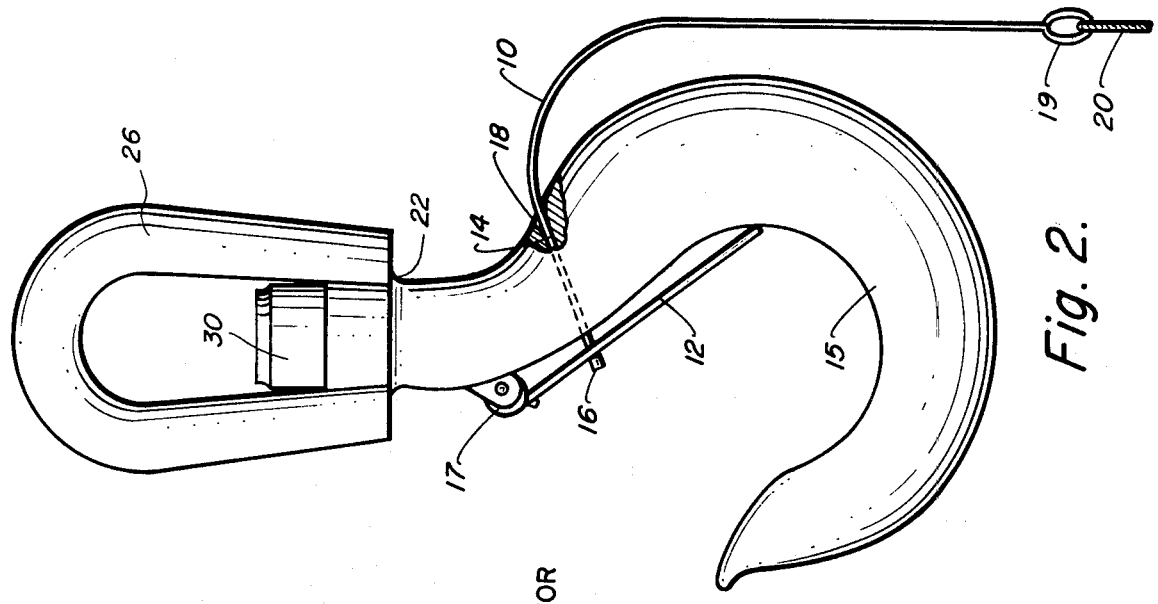
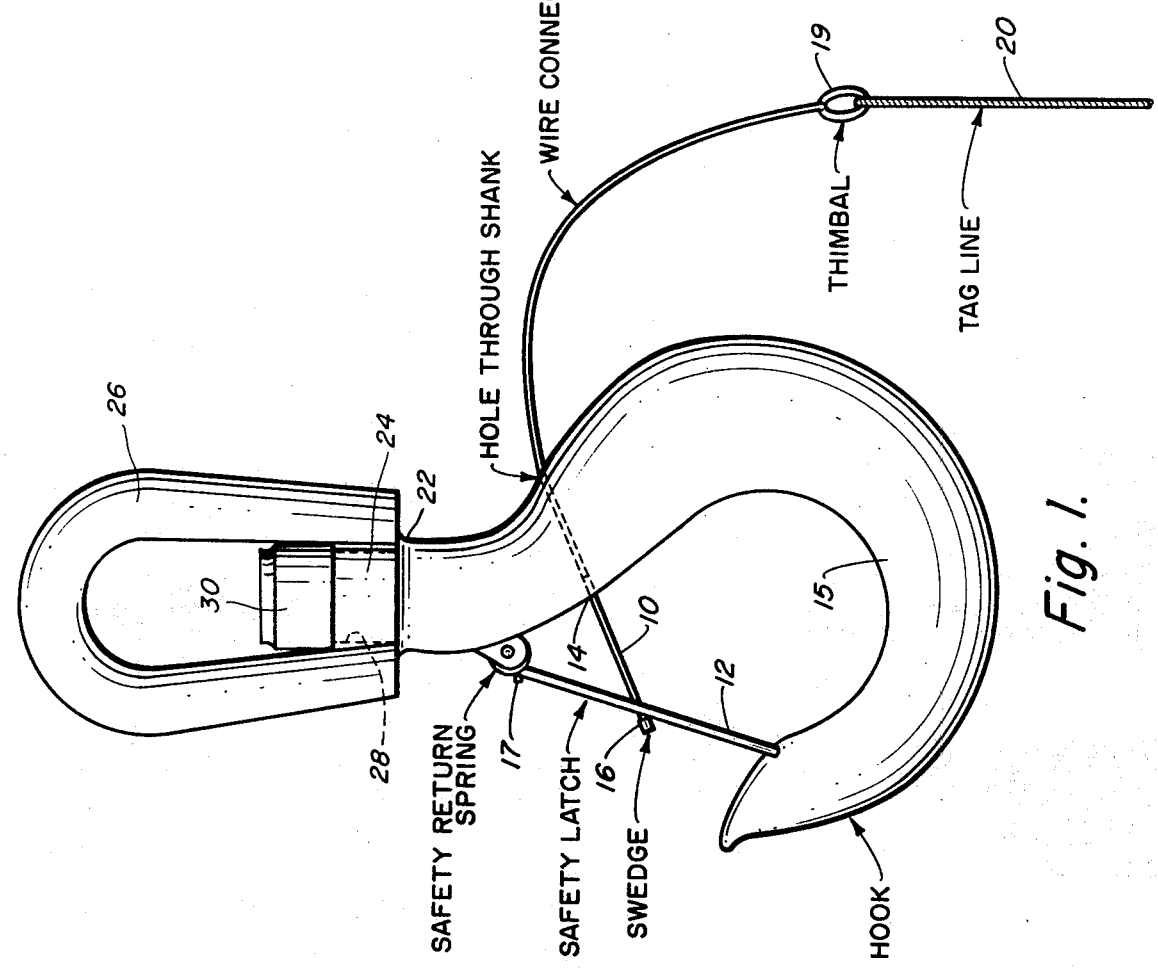

REMOTE CONTROLLED SAFETY HOOK

BACKGROUND

This invention relates to improvements in safety hooks and particularly with load handling safety hooks of cranes on floating platforms. Safety crane hooks used for lifting loads are well known and usually incorporate a swivel which enables the hook to be rotated about a vertical axis. These often include a latch which is normally biased across the bight of the hook by a suitable latch spring which acts to prevent the disengagement of the load to be lifted.

The relative motion between the hook held load and other surfaces on which the load would be placed, due to motion of the floating platforms, demands that the hook not release when collisions of the load and other surfaces cause slack line and hook. However, the hook must be released after the load is positioned on a surface, and when the surface is not readily accessible, release of the hook becomes very difficult. This problem is greatly increased on moving hoist systems.

An object of the present invention is to provide a safety hook that can be remotely manipulated to free a load or to connect to a load without danger to the operator. A further object of the invention is to provide for remote operation of a safety hook used with a hoist system on a floating platform.

SUMMARY

This invention is for a hoist line hook provided with a remotely-controlled spring biased safety latch to prevent accidental disengagement of a load. A tag line is connected to the safety latch for remote operation of the latch. A wire connector passes through a hole in the shank of the hook and is connected to the safety latch; a downward pull on the tag line by the operator will pull the wire through the hole in the shank of the hook forcing the safety latch to open and permitting disengagement of a load.

BRIEF DESCRIPTION OF THE DRAWING

FIG. 1 illustrates a side elevational view of a hook with a safety latch shown in closed position.

FIG. 2 illustrates the hook of FIG. 1 with the safety latch shown in open position with a pull on the tag line.

DESCRIPTION

The remote controlled safety latch can be adapted to commercially available hooks and several types of hooks can be used with the safety latch control. A wire or wire rope connector 10 of suitable length is attached, as shown in FIGS. 1 and 2, to the safety latch 12 and directed through a hole 14 drilled through the shank of the hook 15. The hole 14 is of such a size that the working load capacity of hook 15 is not appreciably reduced. Wire connector 10 is slightly smaller in diameter than hole 14 drilled through the shank of hook 15. The wire connector passes through hole 14 and is attached to safety latch 12 with a swedge fitting 16, for example, as shown. Hole 14 provides some protection to wire 10 where it passes through the hook shank. The rearward end of hole 14 can be flared at 18 as shown in FIG. 2 if desired for ease in sliding wire connector 10 when the hook is turned somewhat at an angle. A return spring 17 tends to keep safety latch 12 closed. A thimble 19 is installed on the free end of the wire connector for attachment of one end of a rope tag line 20. Tag line 20 is usually held by the tag line handler or operator some distance away and is used to control the safety latch 12 and to guide hook 15 toward a load and into position. The tag line 20 is slackened after hook 15 is positioned allowing the closing of the spring safety latch 12. A load is released from the hook by pulling on the tag line which in turn opens the safety latch and also forces the hook out of position and away from the load.

Hook 15 may be provided at the upper end of the shank with a flange 22 from which projects a vertical extension 24. The lower portion of loop 26 forms a vertical bearing having a vertical passage 28 extending therethrough. The upper end 24 of the hook shank is held swively engaged in the bearing passage 28 by means of an enlarged head 30 secured to the upper end of the hook shank in any suitable manner. This constitutes one typical manner for swively mounting hook 15, and any suitable swivel mount may be used.

The remote controlled safety latch with its tag line can be used when relative movements of the hook with respect to loads prevent efficient hook placement and release. This type safety latch control has an advantage in that the hook can be guided and the safety latch controlled with one tag line. Hook attachment times and hook release times are greatly decreased with the use of this device especially when handling loads with cranes positioned on moving platforms. Safety is greatly enhanced around crane operations in this type environment since the need for hazardous work by riggers to approach inaccessible loads to release hooks is eliminated.

Several types and sizes of hooks can be used with the manual remote safety latch release controls described herein. Longer wire connectors can be attached to the safety latch when used with larger hooks, also, several types of spring closed safety latches can be used. If desired, a special hook can be forged with a hole in the shank and rated accordingly.

Obviously, other embodiments and modifications of the present invention will readily come to those of ordinary skill in the art having the benefit of the teachings presented in the foregoing description and the drawings. It is therefore to be understood that this invention is not to be limited thereto and that these modifications and embodiments are intended to be included within the scope of the appended claims.

What is claimed is:

1. A remote controlled safety hook used for lifting loads, particularly for use with cranes and hoists mounted on floating platforms, comprising:
    a. a hook body having a hook shank and a hook point; said hook shank being mounted in a swivel which enables the hook to be rotated about a vertical axis;
    b. a safety latch means pivotally connected to said hook body adjacent to the hook shank and normally extending across the bight of the hook to the hook point;
    c. said safety latch means being swingable between open and closed positions; said latch means being normally biased to the closed position;
    d. a passage extending through the hook shank, from the rear side of the hook in a general direction toward the hook point; said passage being larger at the rearward end thereof;
    e. a thin elongated flexible connector means slidably extending through said passage in the hook shank; said passage through which said thin elongated connector means extends providing protection thereto.

2. A remote controlled safety hook as in claim 1 wherein a thimble is provided at the other end of said